United States Patent [19]

Nishiki

[11] Patent Number: 4,901,336
[45] Date of Patent: Feb. 13, 1990

[54] X-RAY RADIOGRAPHIC APPARATUS
[75] Inventor: Masayuki Nishiki, Tokyo, Japan
[73] Assignee: Kabushiki Kaisha Toshiba, Kawasaki, Japan
[21] Appl. No.: 286,151
[22] Filed: Dec. 19, 1988
[30] Foreign Application Priority Data Dec. 18, 1987 [JP] Japan ................................ 62-320418

[51] Int. Cl.⁴ .............................................. H05G 1/64
[52] U.S. Cl. ........................................ 378/99; 378/97; 250/370.09
[58] Field of Search .................... 378/97, 99; 358/111; 250/370.09

[56] References Cited

U.S. PATENT DOCUMENTS 4,383,327 5/1983 Kruger .................................... 378/99
4,736,397 4/1988 Velasguey ........................... 358/111

Primary Examiner—Craig E. Church
Attorney, Agent, or Firm—Cushman, Darby & Cushman

[57] ABSTRACT

An X-ray radiographic apparatus including a solid-state image sensor having a photoelectric conversion member and a transfer member. A system controller stops supplying field shift pulses, and a electric charge is not transferred from the photoelectric conversion member to the transfer member, during X-ray irradiation until a quantity of X-rays reaches predetermined value. One frame image data from the solid-state image sensor just after X-ray irradiating term is obtained. It is easy to obtain data corresponding to one frame image which is of proper density. The electric signal is read from the transfer member while the system controller has stopped the supplying of field shift pulses. It is possible to suppress an increase of dark current noise, and obtain high quality X-ray image data.

6 Claims, 2 Drawing Sheets

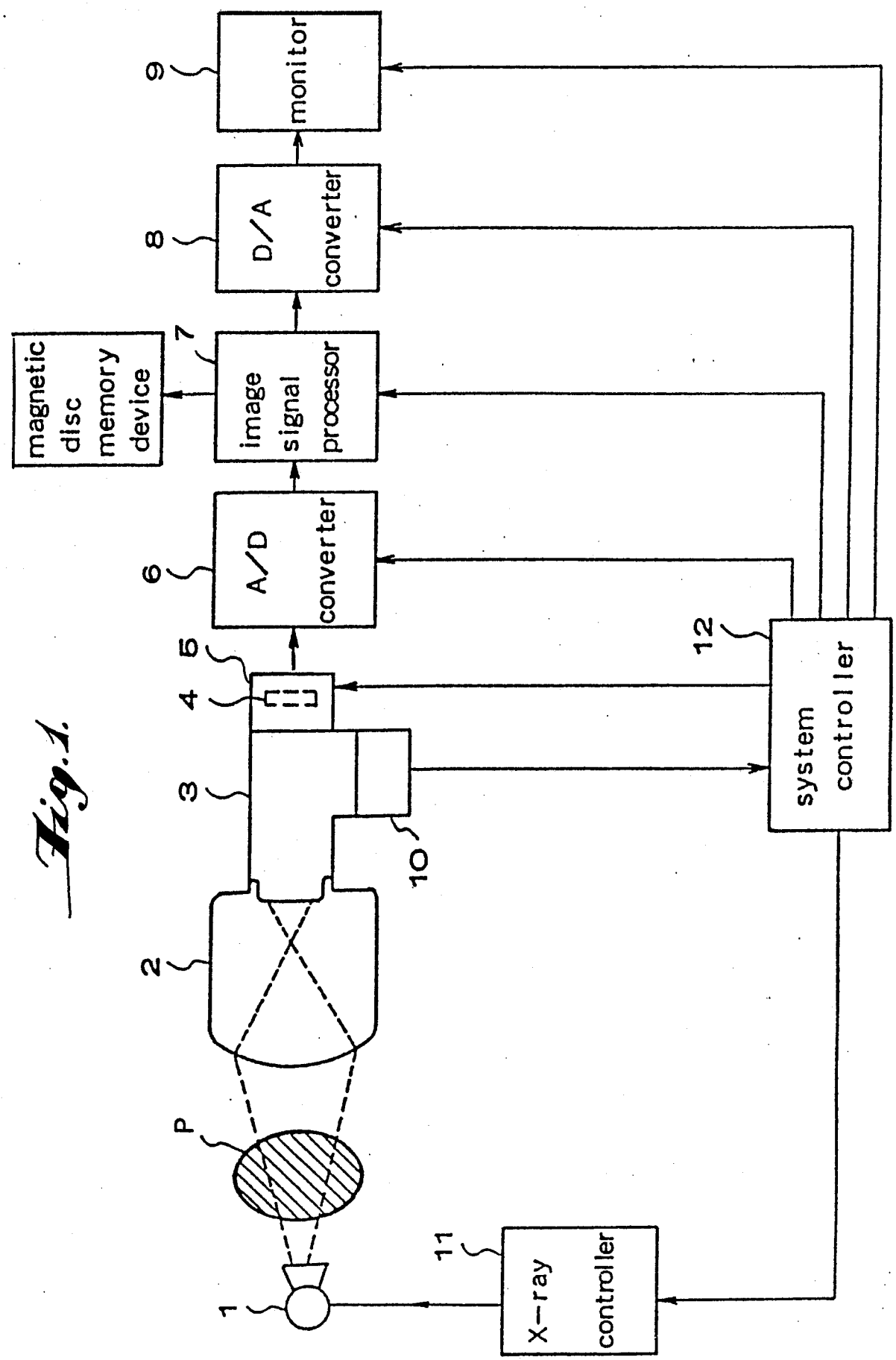

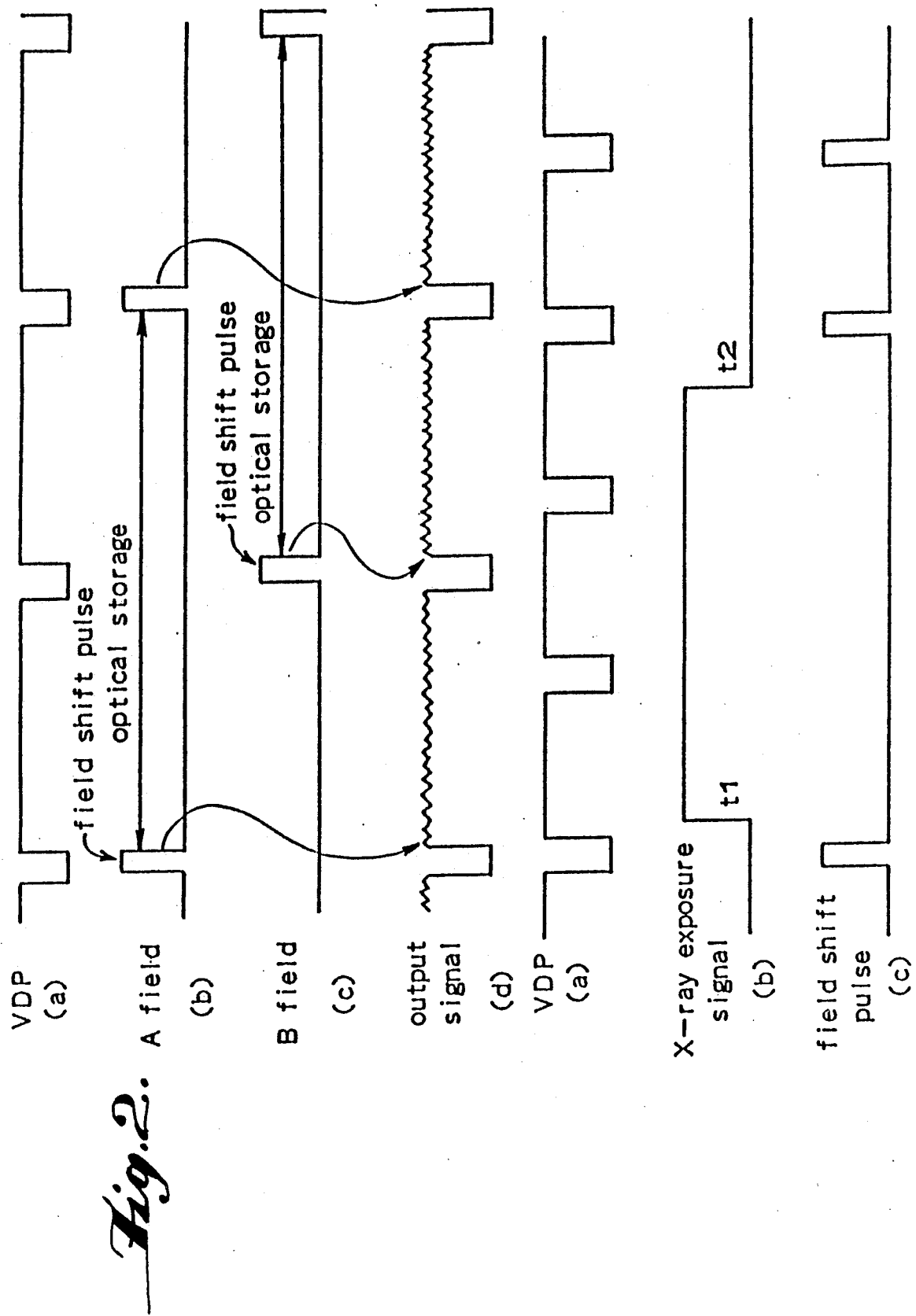

X-RAY RADIOGRAPHIC APPARATUS

BACKGROUND OF THE INVENTION

1. Field of the Invention

This invention relates to an X-ray radiographic apparatus providing a solid-state image sensing device for photographing an X-ray radiographic image.

2. Description of Related Art

Generally, an automatic X-ray exposure unit is provided in an X-ray radiographic apparatus to obtain an adequate density of the X-ray picture. In this automatic X-ray exposure unit, X-rays transmitted through an object is detected by detecting means, and if the detected total quantity of X-rays reaches a predetermined value, irradiation by X-rays is stopped. In this manner, adequate density of the X-ray picture is obtained. One type of automatic X-ray exposure unit uses an Image Intensifier (I.I.) as a detecting means. It includes a phototimer in the rear of the I.I. to control X-ray exposure time in accordance with a thickness of the object or a portion thereof.

In a conventional X-ray radiographic apparatus, an image pick up tube has been used to pick up image. However, an image pick up tube has significant limitations relating to pixel number and reading time. For this reason, solid-state image sensing devices, such as a charge-coupled device (CCD) have come into used as a substitute for the image pick up tube.

In general, one frame period is fixed to a predetermined period of time, such as 1/30 sec., as in a TV camera. X-ray exposure time is varied in accordance with the thickness of the object or a portion thereof. Occasionally X-ray exposure time exceeds one frame period (1/30 sec.). Accordingly, if the X-ray exposure time is controlled automatically, sometimes the charge is read out before the detected total quantity of X-rays reaches a desired level.

In this type of X-ray radiographic apparatus, it is necessary to add plural frames to obtain adequate density of an X-ray image. The use of plural frames makes the X-ray radiographic apparatus complex.

SUMMARY OF THE INVENTION

It is an object of the present invention to provide an X-ray radiographic apparatus which uses a solid-state image sensing device capable of easily obtaining an adequate density of X-ray image.

An X-ray radiographic apparatus according to this invention comprises:

an X-ray tube for irradiating an object with X-rays, an image intensifier for converting an image formed by X-rays transmitted through the object into an optical image, solid-state image sensing means for picking up an optical image output from said image intensifier, detecting means for detecting a X-ray irradiating term when the X-rays is irradiated until a quantity of X-rays reaches predetermined value, control means for stopping irradiation of X-rays, the control means including a field shift pulse power supply which is used as a trigger to transfer a electric signal from a photoelectric conversion member to a transfer member during the term of X-ray irradiating.

Using the present invention, it is easier to obtain a proper density of frame image data than it is by using conventional devices.

BRIEF DESCRIPTION OF THE DRAWINGS

FIG. 1 is a schematic/block diagram an embodiment of the X-ray diagnostic apparatus according to the present invention.

FIG. 2 is a diagram showing the characteristics of a solid-state image sensing device used in the FIG. 1 embodiment.

FIG. 3 is a diagram explaining the operation of the X-ray diagnostic apparatus shown in FIG. 1.

DETAILED DESCRIPTION OF THE PREFERRED EMBODIMENT

Embodiments of an X-ray radiographic apparatus according to the present invention will be described hereinafter with reference to the accompanying drawings.

FIG. 1 is a schematic/block diagram an embodiment of the X-ray diagnostic apparatus according to the present invention. It utilizes a solid-state sensing device. The X-ray radiographic apparatus comprises X-ray tube 1, I.I. 2, optical system 3, TV camera 5, A/D (analog-to-digital) converter 6, image signal processor 7, D/A (digital-to-analog) converter 8, monitor 9, X-ray controller 11, and system controller 12.

When a high voltage is applied to tube 1 from X-ray controller 11, X-rays are irradiated from tube 1 onto an object P. X-rays transmitted through object P are detected by I.I. 2. X-rays transmitted through object P are converted by I.I.2 to a optical image. The optical image is transmitted through optical system 3 including photo timer 10 to TV camera 5.

TV camera 5 includes a solid-state image sensing device 4 such as, for example, a charge-coupled device (CCD), whereby the optical image is picked up at rate of 30 frames per second. An analog video signal from TV camera 5 is converted by A/D converter 6 to a digital video signal.

The digital video signal is processed properly by image signal processor 7. The processed digital video signal is converted by D/A converter 8 to an analog video signal. A magnetic disc memory device 13 is connected to image signal processor 7 for storing the processed digital video signal. Monitor 9 displays a image based on the analog video signal provided by D/A converter 8.

System controller 12 is coupled to X-ray controller 11, TV camera 5, A/D converter 6, image signal processor 7, D/A converter 8, and monitor 9. System controller 12 controls irradiation timing, image read-out and write-in timing, etc.

The characteristic of the solid-state image sensing device 4 will be described with reference to FIG. 2. The solid-state image sensing device 4 such as CCD has two kinds of fields A, B as a photosensitive storage section. Each field is a frame storage interlace mode. As shown in line (a) of FIG. 2, a video signal is generated from TV camera 5 in synchronism with the Vertical Drive Pulse (VDP) of one field per 1/60 second.

The solid-state image sensor 4 comprises of the photoelectric conversion member and transfer member. The photoelectric conversion member converts an incident optical image to an electric signal. The electric signal is transferred to the transfer member when the system controller 12 supplies a field shift pulse to the solid-state image sensors 4. Then, the electric signal is stored in the transfer member. System controller 12 supplies field shift pulses to the each field A, B alternately in synchronism with the VDP as shown in lines (b) and (c) of FIG. 2. As shown in line (d) of FIG. 2, after transfer member receives the electric signal from each field A, B each field A, B reverts to an optical storage state.

The operation of the X-ray radiographic apparatus with the above arrangement will be described with reference to FIG. 3. System controller 12 supplies an X-ray irradiating trigger signal to X-ray tube 1 through X-ray controller 11 (time t1). The X-rays irradiated X-ray tube 1 and transmitted through object P is detected by I.I. 2.

X-rays are converted by I.I. 2 to an optical image. A portion of the optical image is fed to photo timer 10 in optical system 3. Photo timer 10 supplies a stop signal to system controller 12 when the detected total quantity of X-rays reaches the predetermined value. System controller 12 supplies an X-ray irradiating stop signal to X-ray tube 1 through X-ray controller 11 (time t2).

According to this invention, the system controller 12 stops supplying the field shift pulse during X-ray exposure term (from t1 to t2). After the image density becomes adequate, namely, the detected total quantity of X-rays reaches the predetermined value (t2), system controller 12 supplies a field shift pulse to solid-state image sensor 4. Thus, it is possible to obtain an adequate density of X-ray image by reading one image just after time t2. An analog video signal fed through the solid-state image sensor 4 is converted by A/D converter 6 to a digital video signal. The digital video signal is processed properly by image signal processor 7. The processed digital video signal is converted by D/A converter 8 to an analog video signal. Monitor 9 displays a image based on the analog video signal converted by D/A converter 8.

Even though the field shift pulse is stopped, a vertical drive pulse is supplied. Thus, the electric signal (charge) is not transferred from the photoelectric conversion member to the transfer member, but the electric signal (charge) from the transfer member is read continuously. Accordingly, it is possible to suppress a increase of dark current noise, and obtain high quality image by reading one frame image.

Magnetic disc memory device 13 is connected to image signal processor 7. System controller 12 supplies instructions to image signal processor 7 and magnetic disc memory device 13. Magnetic disc memory device 13 stores one frame image just after an X-ray irradiating term. According to this invention, it is possible to store one frame image except frame images which are not included X-ray image information.

It is desireable to obtain as an output signal from the solid-state image sensor 4, a video signal which includes X-ray image information (without noise). It is very efficient to use one frame image just after X-ray irradiating term.

In aforementioned embodiment, one frame image just after X-ray irradiating term is regarded as a video signal which includes X-ray information. Image signal processor 7 provides frame memories. If a pixel value of specific region or added plural pixel value of specific region in the frame memory exceeds a predetermined value, one frame just after that time is regarded as a video signal which includes X-ray information and magnetic disc memory device 13 stores this one frame image data.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An X-ray radiographic apparatus comprising:
   an X-ray tube for irradiating an object with X-rays;
   an image intensifier for receiving X-rays transmitted through said object and generating, an optical image indicative thereof;
   solid-state image means for receiving an optical image from said image intensifier and providing a signal indicative thereof, said solid-state image means including a photoelectric conversion member and a transfer member;
   detecting means for sensing X-irradiation determining when irradiation has reached a predetermined level; and
   control means for stopping a supply of field shift pulses used as a trigger to transfer an electric signal from said photoelectric conversion member to said transfer member during the term of X-ray irradiating.

2. An apparatus according to claim 1, wherein said control means comprises means for causing the reading of data corresponding to one frame image from said solid-state image sensing means just after said X-ray irradiating term.

3. An apparatus according to claim 1, wherein said control means control comprises means for causing the reading of said electric signal from said transfer member during a term when said field shift pulse is not being supplied.

4. An apparatus according to claim 1 further comprising an image signal processor, and wherein said control means comprises means for causing the storage of one frame of image data from said image signal processor if a pixel value of specific region in a frame memory exceeds a threshold level.

5. An apparatus according to claim 1 further comprising an image signal processor, and wherein said control means comprises means for causing the storage of one frame of image data from said image signal processor if an added plural pixel value of specific region in said frame memory exceeds a threshold level.

6. An apparatus according to claim 1 further comprising an image signal processor, and wherein said control means comprises means for causing the storage of one frame of image data from said image signal processor just after said X-ray irradiating term.

* * * * *